(12) United States Patent
Oh et al.

(10) Patent No.: US 11,915,700 B2
(45) Date of Patent: Feb. 27, 2024

(54) DEVICE FOR PROCESSING USER VOICE INPUT

(71) Applicant: Samsung Electronics Co., Ltd., Suwon-si (KR)

(72) Inventors: Yangkyun Oh, Suwon-si (KR); Jaeyung Yeo, Suwon-si (KR); Changryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 17/891,733

(22) Filed: Aug. 19, 2022

(65) Prior Publication Data

US 2022/0392448 A1  Dec. 8, 2022

Related U.S. Application Data

(63) Continuation of application No. 17/043,577, filed as application No. PCT/KR2019/003097 on Mar. 18, 2019, now Pat. No. 11,455,997.

(30) Foreign Application Priority Data

Mar. 29, 2018 (KR) ........................ 10-2018-0036855

(51) Int. Cl.
*G10L 15/00* (2013.01)
*G10L 15/02* (2006.01)
(Continued)

(52) U.S. Cl.
CPC .............. *G10L 15/22* (2013.01); *G10L 15/02* (2013.01); *G10L 15/04* (2013.01); *G10L 15/30* (2013.01); *G10L 15/08* (2013.01)

(58) Field of Classification Search
CPC ......... G10L 15/07; G10L 15/20; G10L 15/22; G10L 15/26; G10L 15/30; G10L 15/02;
(Continued)

(56) References Cited

U.S. PATENT DOCUMENTS 7,299,177 B2   11/2007  Broman et al.
7,496,510 B2   2/2009   Frank et al.
(Continued)

FOREIGN PATENT DOCUMENTS

KR   10-2013-0082835 A   7/2013
KR   10-2015-0086332 A   7/2015
(Continued)

OTHER PUBLICATIONS

International Search Report and Written Opinion of the International Searching Authority in connection with International Application No. PCT/KR2019/003097 dated Jul. 8, 2019, 16 pages.
(Continued)

*Primary Examiner* — Vu B Hang
(74) *Attorney, Agent, or Firm* — Jefferson IP Law, LLP

(57) ABSTRACT

An electronic device according to an embodiment comprises a microphone, a communication circuitry, a memory storing utterance pattern information of a first user registered in the electronic device and instructions, and a processor connected to the microphone, the communication circuitry, and the memory. The instructions, when executed by the processor, cause the electronic device to: obtain a utterance through the microphone; determine whether the utterance is uttered by the first user based on the utterance pattern information; based on being determined the utterance is uttered by the first user, transmit the utterance to an external server through the communication circuitry; receive a response message corresponding to the utterance from the external server through the communication circuitry; and execute at least one function corresponding to the response message. The response message is generated with reference to utterance history of a second user different from the first user.

12 Claims, 12 Drawing Sheets

(51) Int. Cl.
*G10L 15/04* (2013.01)
*G10L 15/22* (2006.01)
*G10L 15/30* (2013.01)
*G10L 15/08* (2006.01)

(58) Field of Classification Search
CPC ....... G10L 15/063; G10L 15/08; G10L 15/14; G10L 15/197; G10L 15/1822; G10L 15/183; G10L 15/193; G10L 15/19; G10L 15/065; G10L 2015/0631; G10L 17/00; G10L 17/02; G10L 17/04; G10L 17/06
See application file for complete search history.

(56) References Cited

U.S. PATENT DOCUMENTS

| | | |
|---|---|---|
| 7,778,832 B2 | 8/2010 | Broman et al. |
| 8,660,849 B2 | 2/2014 | Gruber et al. |
| 8,670,979 B2 | 3/2014 | Gruber et al. |
| 8,812,318 B2 | 8/2014 | Broman et al. |
| 9,111,407 B2 | 8/2015 | Broman et al. |
| 9,230,543 B2 | 1/2016 | Kim et al. |
| 9,305,554 B2 | 4/2016 | Jagatheesan et al. |
| 9,852,424 B2 | 12/2017 | Broman et al. |
| 2002/0091517 A1 | 7/2002 | Frank et al. |
| 2012/0016678 A1 | 1/2012 | Gruber et al. |
| 2012/0134478 A1 | 5/2012 | Broman et al. |
| 2012/0245944 A1 | 9/2012 | Gruber et al. |
| 2013/0159003 A1 | 6/2013 | Kim et al. |
| 2015/0025890 A1 | 1/2015 | Jagatheesan et al. |

FOREIGN PATENT DOCUMENTS

| | | |
|---|---|---|
| KR | 10-2016-0027728 A | 3/2016 |
| KR | 10-2016-0028468 A | 3/2016 |
| KR | 10-2016-0147303 A | 12/2016 |
| KR | 10-1775708 B1 | 9/2017 |

OTHER PUBLICATIONS

Korean Office Action dated Nov. 9, 2023, issued in Korean Application No. 10-2018-0036855.

| | UTTERANCE HISTORY DATA |
|---|---|
| 1 | {Record No:R01,<br>Tag:{Speaker: User A, Date/Time: 2017/8/18 07:32:12, Place:Home},<br>Utterance: {BUY 2 LITERS OF MILK, ONE TRAY OF 15 EGGS, AND ONE WATERMELON ON WAY HOME}<br>} |
| 2 | {Record No:R02,<br>Tag:{Speaker: User B,<br>DateTime: 2017/8/18 07:32:20, Place:Home},<br>Utterance: {OKAY}<br>} |
| 3 | {Record No:R03,<br>Tag:{Speaker: User A,<br>DateTime: 2017/8/18 08:00:10, Place:Home}, Utterance: {Bixby!! WHAT'S WEATHER TODAY?}<br>} |

225

| | UTTERANCE HISTORY DATA |
|---|---|
| 1 | {{Datetime: 2017/8/18 07:32:12}<br>{Place: Home}<br>{Speaker: A}<br>{Result: NoAction}<br>{Utterance: {{Intension: PRODUCT PURCHASE}<br>    {item: 2 LITERS OF MILK}<br>    {item: ONE TRAY OF 15 EGGS}<br>    {item: ONE WATERMELON}<br>    }}<br>} |

| BEFORE REFERRING TO UTTERANCE HISTORY OF 'B' | AFTER REFERRING TO UTTERANCE HISTORY OF 'B' |
|---|---|
| {{Intension:PRODUCT PURCHASE} {Item:???} {Place: C MART} {Etc: THING THAT 'A' TOLD ME TO BUY IN MORNING}} | {{Intension: PRODUCT PURCHASE} {Item: 2 LITERS OF MILK} {Item: ONE TRAY OF 15 EGGS} {Item: ONE WATERMELON} {Place: C MART} |
| {{Intension:PRODUCT PURCHASE} {Item: THING THAT 'A' TOLD ME TO BUY IN MORNING} {Place: C MART} } | |

DEVICE FOR PROCESSING USER VOICE INPUT

CROSS-REFERENCE TO RELATED APPLICATIONS

This application is a continuation application of prior application Ser. No. 17/043,577, filed on Sep. 29, 2020, which is a U.S. National Stage application under 35 U.S.C. § 371 of an International application number PCT/KR2019/003097, filed on Mar. 18, 2019, which is based on and claims priority of a Korean patent application number 10-2018-0036855, filed on Mar. 29, 2018, in the Korean Intellectual Property Office, the disclosure of each of which is incorporated by reference herein in its entirety.

BACKGROUND

1. Field

Embodiments disclosed in this specification relate to a technology for a device processing a user voice input.

2. Description of Related Art

In addition to the conventional input scheme using a keyboard or a mouse, recent electronic devices may support a voice input scheme. For example, the electronic devices such as a smartphone or a tablet PC may recognize a user's utterance in a state where a speech recognition service is executed and may execute an operation corresponding to the utterance.

The speech recognition service may receive the user's utterance as an input, and may recognize the received utterance. The speech recognition service may provide the user with the result corresponding to the utterance, using a specific phrase included in the user's utterance. For example, the speech recognition service may grasp the user's intent from the utterance based on a natural language processing technology and may provide the user with the result matched with the grasped intent.

SUMMARY

A speech recognition service may analyze a user's utterance and may grasp the user's intent. Besides, the speech recognition service may determine detailed parameters for performing a function (e.g., a specific operation of an electronic device) matched with the user's intent. Moreover, when it is difficult to determine the intent and the parameters by using only the user's utterance, the speech recognition service may additionally use pieces of information associated with the user.

However, in the case where only information associated with the user who has spoken is used, when information associated with another user other than the user who has spoken is required, the speech recognition service may not determine the intent and the parameters. Various embodiments disclosed in this specification provide a device that provides an improved speech recognition service with reference to pieces of information associated with another user other than a user who has spoken.

According to an embodiment disclosed in this specification, at least one server may include a network interface, storage, and at least one processor providing a speech recognition service. The at least one processor may be configured to receive a first utterance of a first user from a first terminal of the first user registered in the speech recognition service, through the network interface, to store the received first utterance in the storage, to receive a second utterance of a second user from a second terminal of the second user registered in the speech recognition service, through the network interface after storing the first utterance in the storage, to generate a response message corresponding to the second utterance based on the first utterance of the first user having a relationship with the second user, in response to receiving the second utterance of the second user, and to provide the response message to the second terminal through the network interface.

According to an embodiment disclosed in this specification, an electronic device may include housing, a display positioned inside the housing and exposed by a partial portion of the housing, a microphone positioned inside the housing and exposed by a partial portion of the housing, a wireless communication circuit positioned inside the housing, a memory including utterance pattern information of the first registered user of the electronic device, and instructions, and a processor positioned inside the housing and operatively connected to the display, the microphone, the wireless communication circuit, and the memory. When executed, the instructions stored in the memory may cause the processor to obtain an utterance through the microphone, to transmit the utterance to an external server when the utterance is an utterance by the first user based on the utterance pattern information, to output an interface for requiring a check request of the first user through the display or the microphone to execute the response message for referring to utterance history of a second user associated with the first user when receiving a response corresponding to the utterance from the external server, to receive a check input corresponding to the interface through the display or the microphone, and to execute at least one function corresponding to the response message in response to the received check input.

According to an embodiment disclosed in this specification, at least one server may include a network interface, a storage including an utterance pattern database, and at least one processor providing a speech recognition service. The at least one processor may be configured to receive an utterance from a terminal of a first user registered in the speech recognition service through the network interface, to identify a speaker of the received utterance based on the utterance pattern database, to store the received utterance in the storage in conjunction with the identified speaker, to receive a first utterance of the first user from the terminal, to generate a response message corresponding to the first utterance based on the utterance stored in the storage in response to receiving the first utterance, and to transmit the generated response message to the terminal.

According to an embodiment disclosed in this specification, an electronic device may comprise a microphone, a communication circuitry, a memory storing utterance pattern information of a first user registered in the electronic device and instructions, and a processor connected to the microphone, the communication circuitry, and the memory. The instructions, when executed by the processor, may cause the electronic device to: obtain a utterance through the microphone, determine whether the utterance is uttered by the first user based on the utterance pattern information, based on being determined the utterance is uttered by the first user, transmit the utterance to an external server through the communication circuitry, receive a response message corresponding to the utterance from the external server through the communication circuitry, and execute at least one function corresponding to the response message. The response message may be generated with reference to utterance history of a second user different from the first user.

According to an embodiment disclosed in this specification, a method performed by an electronic device may comprise obtaining a utterance through a microphone, determining whether the utterance is uttered by a first user registered in the electronic device based on utterance pattern information stored in the electronic device, based on being determined the utterance is uttered by the first user, transmitting the utterance to an external server through a communication circuitry, receiving a response message corresponding to the utterance from the external server through the communication circuitry, and executing at least one function corresponding to the response message. The response message may be generated with reference to utterance history of a second user different from the first user.

A device according to the embodiments disclosed in this specification may provide an improved speech recognition service with reference to utterance history of another user different from a user of the electronic device.

Besides, a variety of effects directly or indirectly understood through this disclosure may be provided.

BRIEF DESCRIPTION OF THE DRAWINGS

FIG. 7 is an example of utterance history data stored in an utterance history database according to various embodiments.

FIG. 8 is an example of a response message generated by an intelligence server according to various embodiments.

With regard to description of drawings, the same or similar denotations may be used for the same or similar components.

DETAILED DESCRIPTION

Hereinafter, various embodiments of the disclosure may be described with reference to accompanying drawings.

However, it should be understood that this is not intended to limit the disclosure to specific implementation forms and includes various modifications, equivalents, and/or alternatives of embodiments of the disclosure.

Figure 1:
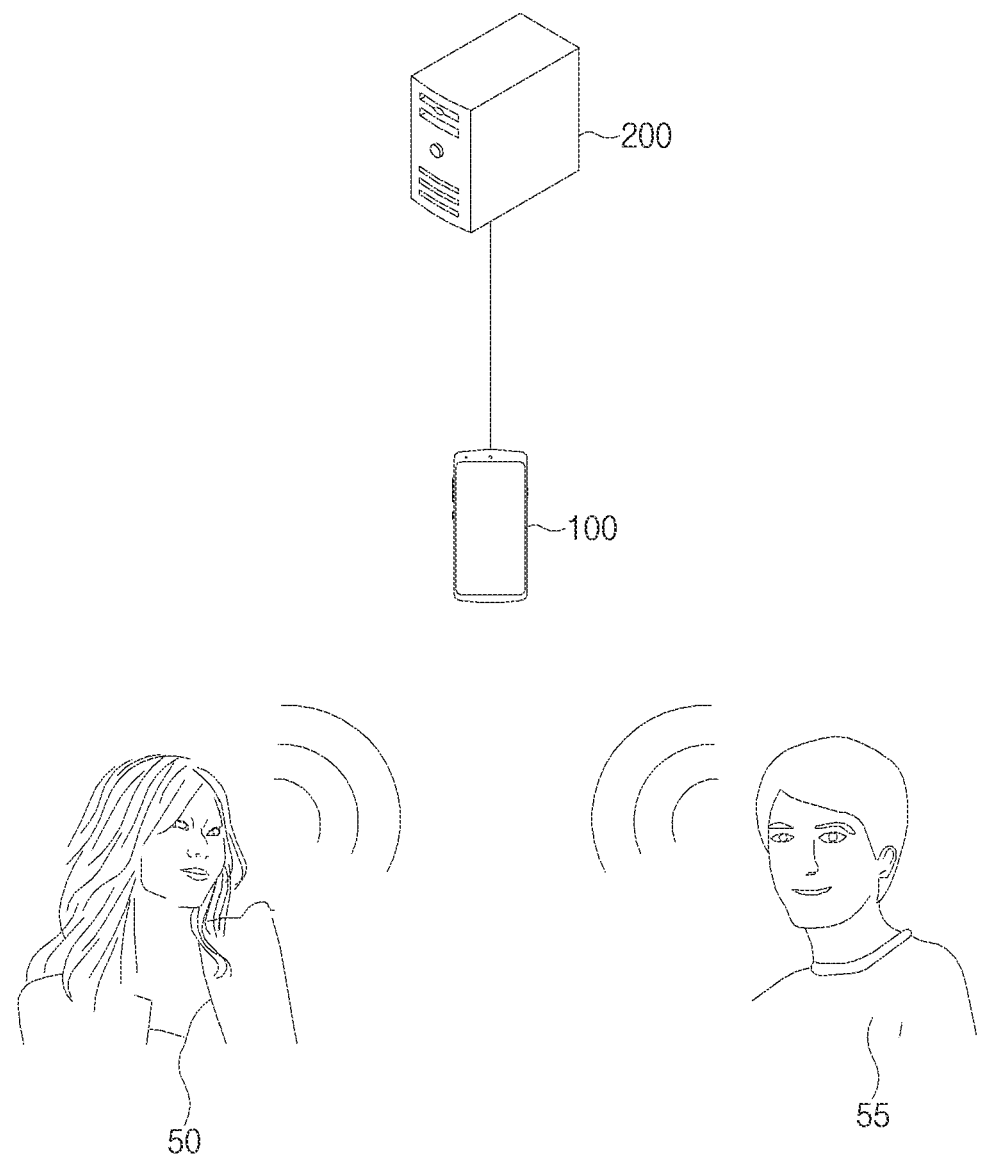
FIG. 1 is a view illustrating an integrated intelligence system, according to various embodiments of the disclosure.

FIG. 1 is a view illustrating an integrated intelligence system, according to various embodiments of the disclosure.

Referring to FIG. 1, an integrated intelligence system 10 may include a user terminal 100 and an intelligence server 200.

The user terminal 100 may provide a service necessary for a user through an app (or an application program) (e.g., an alarm app, a message app, a picture (gallery) app, or the like) stored in the user terminal 100. For example, the user terminal 100 may execute and operate another app through an intelligence app (or a speech recognition app) stored in the user terminal 100. The user terminal 100 may receive a user input for executing the other app and executing an action through the intelligence app of the user terminal 100. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive the utterances of users 50 and 55 as user inputs. For example, the utterance of the users 50 and 55 may include a control command for the user terminal 100 or the intelligence server 200. The user terminal 100 may receive the utterances of the users 50 and 55 and generate a command for operating an app based on the utterances of the users 50 and 55. Accordingly, the user terminal 100 may operate the app, using the command.

In an embodiment, the intelligence server 200 may receive a user voice input from the user terminal 100 over a communication network and may change the user voice input (e.g., the user's utterance) to text data. The intelligence server 200 may generate a response message to be provided to the user terminal 100 based on the text data. For example, the response message may include a path rule or may be referred to as the path rule. The path rule may be generated (or selected) based on the text data. The response message (e.g., path rule) may include information about an action (or an operation) for performing the function of an app or information about a parameter necessary to perform the action. In addition, the response message may include the order of the action of the app. The user terminal 100 may receive the response message, may select an app depending on the response message, and may execute an action included in the response message in the selected app.

In an embodiment, the user terminal 100 may receive a response message corresponding to the utterance of the users 50 and 55, and may provide a speech recognition service that makes it possible to execute the function intended by a user. Hereinafter, the response message provided to the user terminal 100 may be exemplified as a path rule.

For example, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display only the result of a part of the plurality of actions on the display. For example, the user terminal 100 may display only the result, which is obtained by executing the last action, on the display. For another example, the user terminal 100 may receive the user input to display the result obtained by executing the action in the display.

In an embodiment, the intelligence server 200 may include a database in which user information is stored. For example, the intelligence server 200 may receive the user information (e.g., context information, execution of an app, or the like) from the user terminal 100 and may store the user information in the database. The intelligence server 200 may use the user information when generating a response message for a user utterance. For example, at least one parameter included in the response message may be determined based on the user information.

In an embodiment, the intelligence server 200 may include the database storing information about the function in the user terminal 100, the introduction of an application, or the function to be provided. For example, the intelligence server 200 may include a database of functions available to the users 50 and 55. The intelligence server 200 may generate a response message including a function, or the like, which is to be executed in the user terminal 100, with reference to the database.

Figure 2:
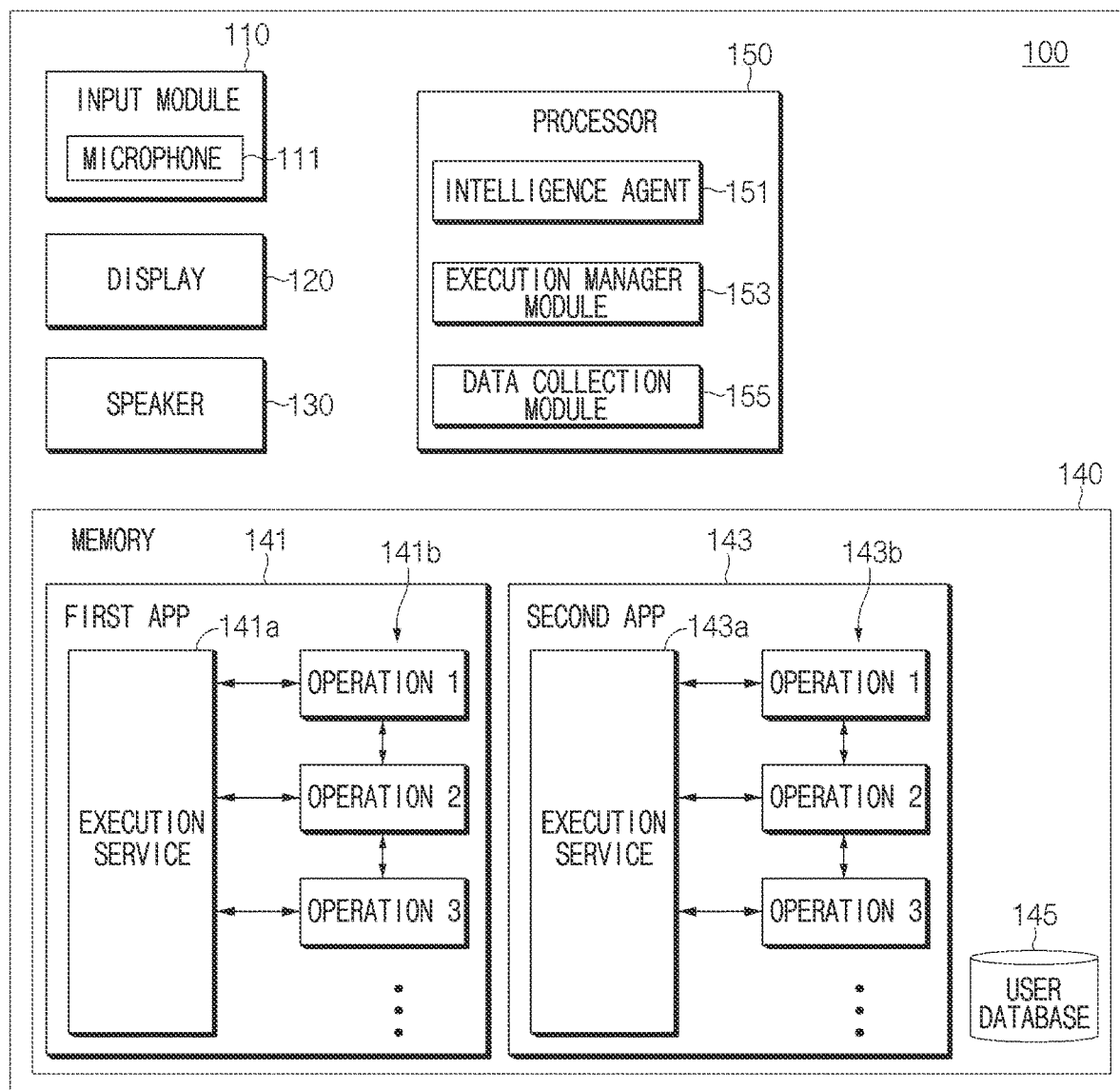
FIG. 2 is a block diagram of a user terminal of an integrated intelligence system according to an embodiment of the disclosure.

FIG. 2 is a block diagram of a user terminal of an integrated intelligence system according to an embodiment of the disclosure.

Referring to FIG. 2, the user terminal 100 may include an input module 110, a display 120, a speaker 130, a memory 140, or a processor 150. The user terminal 100 may further include housing, and elements of the user terminal 100 may be seated in the housing or may be positioned on the housing.

According to an embodiment, the input module 110 may receive a user input from a user (e.g., the users 50 and 55 in FIG. 1). For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) positioned in the user terminal 100 (or the housing of the user terminal 100).

According to an embodiment, the input module 110 may include a microphone (e.g., a microphone 111) that is capable of receiving user utterance as a voice signal. For example, the input module 110 may include a speech input system and may receive the utterance of the user as a voice signal through the speech input system.

According to an embodiment, the display 120 may display an image, a video, and/or an execution screen of an application. For example, the display 120 may display a graphic user interface (GUI) of an app.

According to an embodiment, the speaker 130 may output the voice signal. For example, the speaker 130 may output the voice signal generated in the user terminal 100 to the outside.

According to an embodiment, the memory 140 may store a plurality of apps 141 and 143. The plurality of apps 141 and 143 stored in the memory 140 may be selected, launched, and executed depending on the user input.

According to an embodiment, the memory 140 may include a user database 145 capable of storing various pieces of information associated with a user of the user terminal 100. For example, the user database 145 may store information necessary to recognize a user input. For example, the user database 145 may include a log database capable of storing log information. For another example, the user database 145 may store user information. At least part of the information included in the user database 145 may be transmitted to the intelligence server 200.

According to an embodiment, the memory 140 may store the plurality of apps 141 and 143, and the plurality of apps 141 and 143 may be loaded to operate. For example, the plurality of apps 141 and 143 stored in the memory 140 may be loaded by an execution manager module 153 of the processor 150 to operate. The plurality of apps 141 and 143 may include execution services 141a and 143a performing a function or a plurality of operations (or unit operations) 141b and 143b. The execution services 141a and 143a may be generated by the execution manager module 153 of the processor 150 and then may execute the plurality of operations 141b and 143b.

According to an embodiment, when the operations 141b and 143b of the apps 141 and 143 are executed, an execution state screen according to the execution of the operations 141b and 143b may be displayed in the display 120. For example, the execution state screen may be a screen in a state where the operations 141b and 143b are completed. For another example, the execution state screen may be a screen in a state where the execution of the operations 141b and 143b is in partial landing (e.g., when a parameter necessary for the operations 141b and 143b are not entered).

According to an embodiment, the execution services 141a and 143a may execute the operations 141b and 143b depending on a path rule. For example, the path rule may be referred to as a response message received in response to a user's voice input. For example, the execution services 141a and 143a may be generated by the execution manager module 153, may receive an execution request depending on the path rule from the execution manager module 153, and may execute the operations 141b and 143b of the apps 141 and 143 depending on the execution request. When the execution of the operations 141b and 143b is completed, the execution services 141a and 143a may transmit completion information to the execution manager module 153.

According to an embodiment, when the plurality of operations 141b and 143b are respectively executed in the apps 141 and 143, the plurality of operations 141b and 143b may be executed sequentially. When the execution of one operation (operation 1) is completed, the execution services 141a and 143a may open the next operation (operation 2) and may transmit completion information to the execution manager module 153. Here, it is understood that opening an arbitrary operation is to transition a state of the arbitrary operation to an executable state or to prepare the execution of an arbitrary operation. In other words, when an arbitrary operation is not opened, the corresponding operation may not be executed. When the completion information is received, the execution manager module 153 may transmit an execution request for the next operations 141b and 143b to an execution service (e.g., operation 2). According to an embodiment, when the plurality of apps 141 and 143 are executed, the plurality of apps 141 and 143 may be sequentially executed. For example, when receiving the completion information after the execution of the last operation of the first app 141 is executed, the execution manager module 153 may transmit the execution request of the first operation of the second app 143 to the execution service 143a.

According to an embodiment, when the plurality of operations 141b and 143b are executed in the apps 141 and 143, the result screen according to the execution of each of the executed plurality of operations 141b and 143b may be displayed on the display 120. According to an embodiment, only the part of a plurality of result screens according to the execution of the executed plurality of operations 141b and 143b may be displayed on the display 120.

According to an embodiment, the memory 140 may store an intelligence app (e.g., a speech recognition app providing a speech recognition service) operating in conjunction with an intelligence agent 151. The app operating in conjunction with the intelligence agent 151 may receive and process the utterance of the user as a voice signal. According to an embodiment, the app operating in conjunction with the intelligence agent 151 may be operated by a specific input (e.g., an input through a hardware key, an input through a touchscreen, or a specific voice input) input through the input module 110.

According to an embodiment, the processor 150 may control overall operations of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to an embodiment, the processor 150 may include the intelligence agent 151, the execution manager module 153, or a data collection module 155. In an embodiment, the processor 150 may drive the intelligence agent 151, the execution manager module 153, or the data collection module 155 by executing instructions stored in the memory 140. Modules described in various embodiments of the disclosure may be implemented by hardware or software. In various embodiments of the disclosure, it is understood that the operation executed by the intelligence agent 151, the execution manager module 153, or the data collection module 155 is the operation executed by the processor 150.

According to an embodiment, the intelligence agent 151 may generate an instruction for operating an app based on the voice signal received as the user input. For example, the intelligence agent 151 may receive a path rule from the intelligence server 200 and may generate a command to launch an app based on the path rule. According to an embodiment, the execution manager module 153 may receive the generated instruction from the intelligence agent 151, and may select, launch, and operate the apps 141 and 143 stored in the memory 140.

According to an embodiment, the intelligence agent 151 may transmit the user input received through the input module 110, to the intelligence server 200. Before transmitting the user input to the intelligence server 200, the intelligence agent 151 may pre-process the user input. According to an embodiment, to pre-process the user input, the intelligence agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to an embodiment, the intelligence agent 151 may include all the pre-processing components for performance. However, in another embodiment, the intelligence agent 151 may include a part of the pre-processing components to operate at low power.

According to an embodiment, the intelligence agent 151 may include a wakeup recognition module recognizing a call of a user. The wakeup recognition module may recognize a wake up instruction of the user through the speech recognition module. In the case where the wakeup recognition module receives the wake up instruction, the wakeup recognition module may activate the intelligence agent 151 to receive the user input. According to an embodiment, the wakeup recognition module of the intelligence agent 151 may be implemented with a low-power processor (e.g., a processor included in an audio codec). According to an embodiment, the intelligence agent 151 may be activated depending on the user input entered through a hardware key. In the case where the intelligence agent 151 is activated, an intelligence app (e.g., a speech recognition app) operating in conjunction with the intelligence agent 151 may be executed.

According to an embodiment, the intelligence agent 151 may include a speech recognition module for executing the user input. The speech recognition module may recognize the user input for executing an operation in an app. For example, the speech recognition module may recognize a limited user (voice) input (e.g., utterance such as "click" for executing a capturing operation when a camera app is being executed) for executing an operation such as the wake up instruction in the apps 141 and 143. For example, the speech recognition module for recognizing a user input while assisting the intelligence server 200 may recognize and rapidly process a user instruction capable of being processed by the user terminal 100. According to an embodiment, the speech recognition module for executing the user input of the intelligence agent 151 may be implemented in an app processor.

According to an embodiment, the speech recognition module (including the speech recognition module of a wake up module) of the intelligence agent 151 may recognize the user input, using an algorithm for recognizing a voice. For example, the algorithm for recognizing the voice may be at least one of a hidden Markov model (HIM) algorithm, an artificial neural network (ANN) algorithm, or a dynamic time warping (DTW) algorithm.

According to an embodiment, the intelligence agent 151 may change the voice input of the user to text data. According to an embodiment, the intelligence agent 151 may transmit the voice of the user to the intelligence server 200 and may receive the changed text data. As such, the intelligence agent 151 may display the text data in the display 120.

According to an embodiment, the intelligence agent 151 may receive a path rule from the intelligence server 200. According to an embodiment, the intelligence agent 151 may transmit the path rule to the execution manager module 153.

According to an embodiment, the intelligence agent 151 may transmit an execution result log according to the path rule received from the intelligence server 200, to the data collection module 155. The data collection module 155 may store the transmitted execution result log in the user database 145. The execution result log may be accumulated and managed as user preference information.

According to an embodiment, the execution manager module 153 may receive the path rule from the intelligence agent 151 to execute the apps 141 and 143 and may allow the apps 141 and 143 to execute the operations 141b and 143b included in the path rule. For example, the execution manager module 153 may transmit instruction information for executing the operations 141b and 143b to the apps 141 and 143 and may receive completion information of the operations 141b and 143b from the apps 141 and 143.

According to an embodiment, the execution manager module 153 may transmit or receive the instruction information for executing the operations 141*b* and 143*b* of the apps 141 and 143 between the intelligence agent 151 and the apps 141 and 143. The execution manager module 153 may bind the apps 141 and 143 to be executed depending on the path rule and may transmit the instruction information of the operations 141*b* and 143*b* included in the path rule to the apps 141 and 143. For example, the execution manager module 153 may sequentially transmit the operations 141*b* and 143*b* included in the path rule to the apps 141 and 143 and may sequentially execute the operations 141*b* and 143*b* of the apps 141 and 143 depending on the path rule.

According to an embodiment, the execution manager module 153 may manage execution states of the operations 141*b* and 143*b* of the apps 141 and 143. For example, the execution manager module 153 may receive information about the execution states of the operations 141*b* and 143*b* from the apps 141 and 143. For example, in the case where the execution states of the operations 141*b* and 143*b* are in partial landing (e.g., in the case where a parameter necessary for the operations 141*b* and 143*b* are not input), the execution manager module 153 may transmit information about the partial landing to the intelligence agent 151. The intelligence agent 151 may make a request for an input of necessary information (e.g., parameter information) to the user by using the received information. For another example, in the case where the execution state of the operations 141*b* and 143*b* are in an operating state, the natural utterance may be received from the user, and the execution manager module 153 may transmit information about the apps 141 and 143 being executed and the execution states of the apps 141 and 143 to the intelligence agent 151. The intelligence agent 151 may receive parameter information of the utterance of the user through the intelligence server 200 and may transmit the received parameter information to the execution manager module 153. The execution manager module 153 may change a parameter of each of the operations 141*b* and 143*b* to a new parameter, using the received parameter information.

According to an embodiment, the execution manager module 153 may transmit the parameter information included in the path rule to the apps 141 and 143. When the plurality of apps 141 and 143 are sequentially executed depending on the path rule, the execution manager module 153 may deliver the parameter information included in the path rule from one app to another app.

According to an embodiment, the execution manager module 153 may receive a plurality of path rules. A plurality of path rules may be selected based on the user's utterance. For example, in the case where the user utterance specifies one app 141 executing one operation 141*a* but does not specify the other app 143 executing the other operation 143*b*, the execution manager module 153 may receive a plurality of different path rules, in which the same app 141 (e.g., gallery app) executing the one operation 141*a* is executed and in which the different app 143 (e.g., message app or Telegram app) executing the other operations 143*b* is executed. For example, the execution manager module 153 may execute the same operations 141*b* and 143*b* (e.g., the same successive operations 141*b* and 143*b*) of the plurality of path rules. In the case where the execution manager module 153 executes the same operation, the execution manager module 153 may display a state screen for selecting the different apps 141 and 143 included in the plurality of path rules in the display 120.

According to an embodiment, the data collection module 155 may collect current states of the apps 141 and 143 from the apps 141 and 143. For example, the data collection module 155 may receive context information indicating the current states of the apps 141 and 143 to collect the current states of the apps 141 and 143. The data collection module 155 may store the collected context information in the user database 145.

In an embodiment, the data collection module 155 may collect and manage personal information of the user utilizing the user terminal 100. For example, the data collection module 155 may collect the use information and the execution result of the user terminal 100 to collect personal information of the user. The data collection module 155 may store the collected personal information of the user in the user database 145.

In an embodiment, at least part of the data included in the user database 145 may be transmitted to the intelligence server 200.

Figure 3:
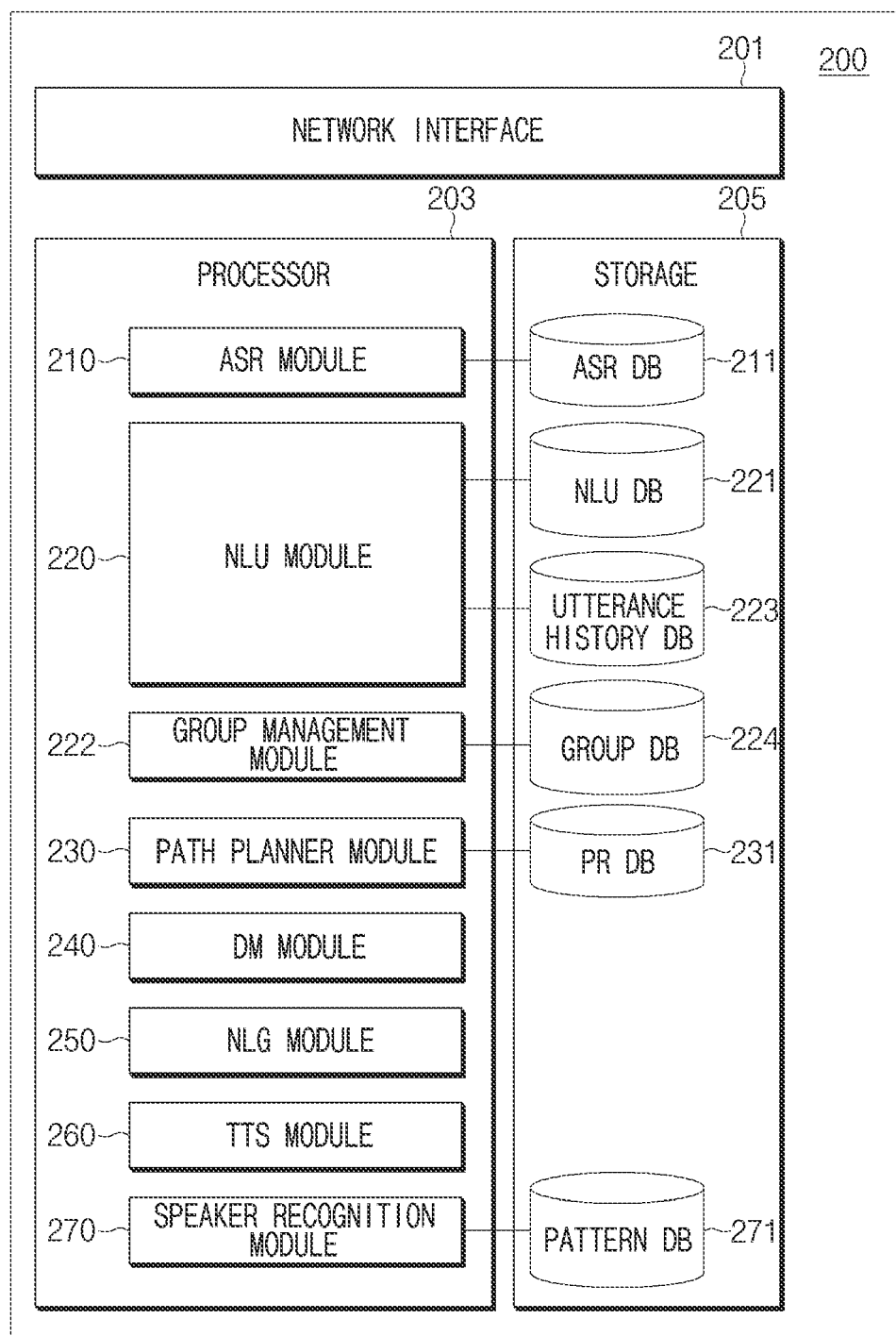
FIG. 3 is a block diagram illustrating an intelligence server of an integrated intelligence system, according to an embodiment of the disclosure.

FIG. 3 is a block diagram illustrating an intelligence server of an integrated intelligence system, according to an embodiment of the disclosure.

Referring to FIG. 3, the intelligence server 200 may include a network interface 201, a processor 203, and storage 205. According to an embodiment, the processor 203 may include an automatic speech recognition (ASR) module 210, a natural language understanding (NLU) module 220, a group management module 222, a path planner module 230, a dialogue manager (DM) module 240, a natural language generator (NLG) module 250, or a text to speech (TTS) module 260. In an embodiment, the processor 150 may drive the plurality of modules by executing instructions stored in a memory (not shown). The plurality of modules may be implemented in hardware or software. In various embodiments of the disclosure, it is understood that the operation executed by the plurality of modules is the operation executed by the processor 203.

According to an embodiment, the ASR module 210 may change the user input received from the user terminal 100 to text data.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert a user utterance into text data, using information associated with phonation and unit phoneme information. For example, the information about the acoustic model and the language model may be stored in an automatic speech recognition database (ASR DB) 211.

According to an embodiment, the NLU module 220 or the path planner module 230 may generate a response message to be transmitted to the user terminal 100, based on the converted text.

In an embodiment, the NLU module 220 may grasp user intent by performing syntactic analysis or semantic analysis. The syntactic analysis may divide the user input into syntactic units (e.g., words, phrases, morphemes, and the like) and may determine which syntactic elements the divided units have. The semantic analysis may be performed by using semantic matching, rule matching, formula matching, or the like. As such, the NLU module 220 may obtain a domain, intent, or a parameter (or a slot) necessary to express the intent, from the user input.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may determine the intent of the user and a parameter with reference to an utterance history database 223. For example, the utterance history database 223 may include conversation history between a plurality of users.

In an embodiment, the group management module 222 may store information about a relationship between a user and a plurality of other users, in a group database 224. For example, the group database 224 may include social data capable of specifying a relationship between a plurality of users. For example, the social data may be referred to as data associated with social activities between different users, such as a call log, or the like. For example, the group management module 222 may determine a relationship between a user and another user, using pieces of information included in the group database 224. The group management module 222 may store information about the determined relationship in the group database 224. In various embodiments, when analyzing the user's utterance based on the relationship determined by the group management module 222, the NLU module 220 may determine whether to refer to utterance history of other users.

In various embodiments, even when the determined parameter is ambiguous, the NLU module 220 may refer to utterance history of other users. For example, there may be a case where the determined parameter is not matched with the attribute of the predefined parameter. The NLU module 220 may determine whether an ambiguous parameter is capable of being updated based on the utterance history of another person. The NLU module 220 may determine another person, of which the utterance history is to be referenced, and may refer to the utterance history of the other person. An embodiment associated with this will be described with reference to FIG. 8. According to an embodiment, the NLU module 220 may grasp the meaning of words extracted from a user input by using linguistic features (e.g., syntactic elements) such as morphemes, phrases, and the like and may match the grasped meaning of the words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words, which are based for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an operation to be executed, in the selected app. The NLU module 220 may determine the parameter corresponding to the determined operation to generate the path rule. According to an embodiment, the path rule generated by the NLU module 220 may include information about the app to be executed, the operation to be executed in the app, and a parameter necessary to execute the operation.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the operation to be executed in the app, and a parameter necessary to execute the operation based on the intent of the user input and the parameter to generate one path rule or a plurality of path rules. For example, the NLU module 220 may arrange the app to be executed and the operation to be executed in the app by using information of the user terminal 100 depending on the intent of the user input in the form of ontology or a graph model to generate the path rule. For example, the generated path rule may be stored in a path rule database (PR DB) 231 through the path planner module 230. The generated path rule may be added to a path rule set of the DB 231.

According to an embodiment, the NLU module 220 may select at least one path rule of the generated plurality of path rules. For example, the NLU module 220 may select an optimal path rule of the plurality of path rules. For another example, when only a part of operation is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 at a request for the user input. For example, the NLU module 220 may transmit one path rule corresponding to the user input to the user terminal 100. For another example, the NLU module 220 may transmit the plurality of path rules corresponding to the user input to the user terminal 100. For example, when only a part of operation is specified based on the user utterance, the plurality of path rules may be generated by the NLU module 220. The one or more path rules may correspond to a response message transmitted to the user terminal 100 by the intelligence server 200.

According to an embodiment, the path planner module 230 may select at least one path rule of the plurality of path rules.

According to an embodiment, the path planner module 230 may deliver a path rule set including the plurality of path rules to the NLU module 220. The plurality of path rules of the path rule set may be stored in the PR DB 231 connected to the path planner module 230 in the table form. For example, the path planner module 230 may deliver a path rule set corresponding to information (e.g., OS information or app information) of the user terminal 100, which is received from the intelligence agent 151, to the NLU module 220. For example, a table stored in the PR DB 231 may be stored for each domain or for each version of the domain.

According to an embodiment, the path planner module 230 may select one path rule or the plurality of path rules from the path rule set to deliver the selected one path rule or the selected plurality of path rules to the NLU module 220. For example, the path planner module 230 may match the user intent and the parameter to the path rule set corresponding to the user terminal 100 to select one path rule or a plurality of path rules and may deliver the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the operation to be executed in the app based on the user intent and the parameter to generate the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user's intent grasped by the NLU module 220 is definite. For example, the DM module 240 may determine whether the user intent is clear, based on whether the information of a parameter is sufficient. The DM module 240 may determine whether the parameter grasped by the NLU module 220 is sufficient to perform a task. According to an embodiment, when the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. When the content provider module executes an operation based on the intent and the parameter grasped by the NLU module 220, the content provider module may generate the result obtained by performing a task corresponding to the user input. According to an embodiment, the DM module 240 may transmit the result generated by the content provider module to the user terminal 100 through the response message for the user input.

According to an embodiment, the NLG module 250 may change specified information to a text form. The information changed to the text form may be in the form of a natural language speech. For example, the specified information may be information about an additional input, information for guiding the completion of an operation corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information in the text form to information of a voice form. The TTS module 260 may receive the information of the text form from the NLG module 250, may change the information of the text form to the information of a voice form, and may transmit the information of the voice form to the user terminal 100. The user terminal 100 may output the information in the voice form to the speaker 130

According to an embodiment, the NLU module 220, the path planner module 230, and the DM module 240 may be implemented with one module. For example, the NLU module 220, the path planner module 230, and the DM module 240 may be implemented with one module to determine the user's intent and the parameter, and to generate a response message (e.g., a path rule) corresponding to the user's determined intent and parameter. Accordingly, the generated response message may be transmitted to the user terminal 100.

In various embodiments, the intelligence server 200 may include a speaker recognition module 270. According to an embodiment, the speaker recognition module 270 may identify the speaker of the utterance received from the user terminal 100. For example, a plurality of utterance patterns registered in the speech recognition service may be stored in a pattern database 271. The speaker recognition module 270 may compare the received utterance with the utterance pattern stored in the pattern database 271. When there is an utterance pattern matched with the received utterance, the speaker recognition module 270 may specify a specific user matched with the matched utterance pattern as a speaker. The operation of the intelligence server 200 including the speaker recognition module 270 will be described later with reference to FIG. 11.

In various embodiments, the intelligence server 200 may be composed of one or more different servers. For example, some modules of the ASR module 210, the NLU module 220, the path planner module 230, the DM module 240, the NLG module 250, the TTS module 260, or the speaker recognition module 270 included in the intelligence server 200 may be implemented with a single server.

Hereinafter, various embodiments to be described later may be described later by citing the reference numerals of FIGS. 2 and 3.

Figure 4:
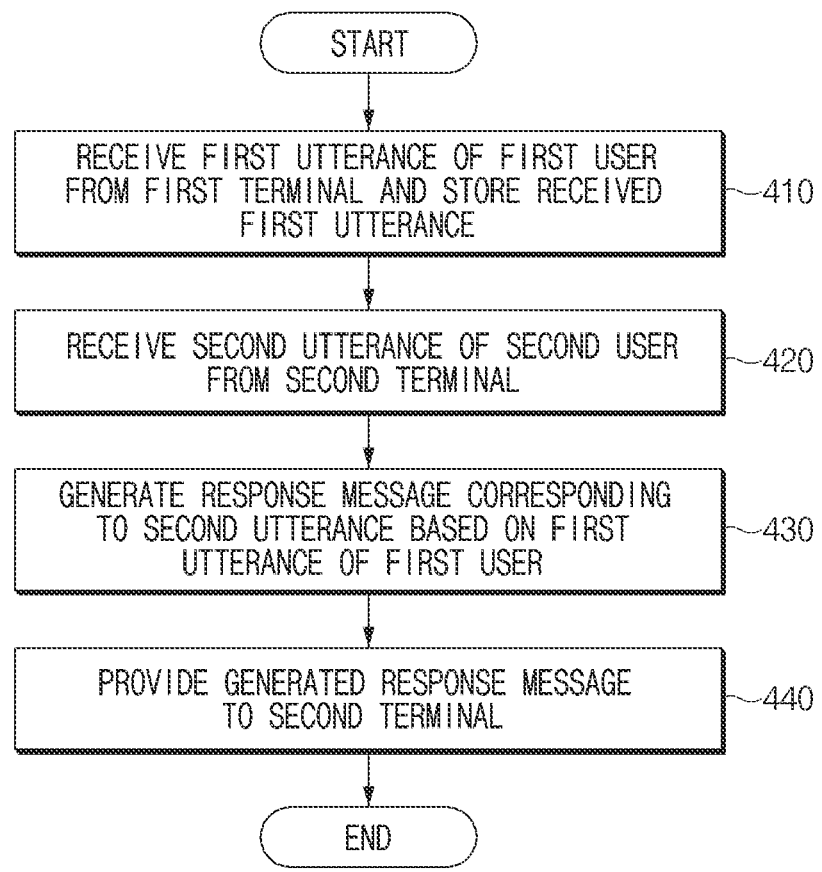
FIG. 4 is a flowchart of a method of providing a speech recognition service that refers to utterance history of another person, according to an embodiment.

FIG. 4 is a flowchart of a method of providing a speech recognition service that refers to utterance history of another person, according to an embodiment.

Referring to FIG. 4, a speech recognition service providing method according to an embodiment may include operation 410 to operation 440. For example, operation 410 to operation 440 may be executed by the intelligence server 200 illustrated in FIG. 3. For example, each operation in operation 410 to operation 440 may be implemented with instructions capable of being performed (or executed) by the at least one module 210, 220, 230, 240, 250, or 260 included in the intelligence server 200. For example, the instructions may be stored in a computer-readable recording medium, the memory of at least one module of the intelligence server 200, or the storage 205 of the intelligence server 200. Hereinafter, in the descriptions about operation 410 to operation 440, a description that is the same as the description given with reference to FIGS. 1 to 3 may not be repeated here.

In operation 410, the intelligence server 200 may receive the first utterance of the first user from the first terminal (e.g., the user terminal 100 in FIG. 1) of the first user registered in a speech recognition service through the network interface 201. For example, the first terminal may be registered as the terminal of the first user in the speech recognition service. The first terminal may receive an utterance and may determine whether the utterance is an utterance by the first user. When the utterance is the utterance by the first user, the first terminal may transmit the utterance to the intelligence server 200. Accordingly, the intelligence server 200 may receive the utterance of a user of the first terminal from the first terminal.

In operation 410, the intelligence server 200 may store the received first utterance in the storage 205. For example, the intelligence server 200 may store the first utterance in the utterance history database 223.

In various embodiments, the first utterance may be stored in a first database associated with the first user.

In operation 420, the intelligence server 200 may be registered in the speech recognition service through the network interface 201; the intelligence server 200 may receive the second utterance of the second user from the second terminal (e.g., the user terminal 100 in FIG. 1) of the second user. For example, the second terminal may be registered as the terminal of the second user in the speech recognition service. The second terminal may receive an utterance and may determine whether the utterance is an utterance by the second user. When the utterance is the utterance by the second user, the second terminal may transmit the utterance to the intelligence server 200. Accordingly, the intelligence server 200 may receive the utterance of a user of the second terminal from the second terminal.

In operation 430, the intelligence server 200 may generate a response message for the second utterance based on the first utterance of the first user having a relationship with the second user, in response to receiving the second utterance of the second user. For example, the response message may be referred to as a "path rule." For example, the first user's utterance history may be used in a speech recognition service provided to the second user. For example, the first user may be a user (e.g., family, friends, or the like) having a relationship with the second user.

In operation 440, the intelligence server 200 may provide the generated response message to the second terminal through the network interface 201. The second terminal may perform a function corresponding to the response message, in response to receiving the response message.

Figure 5:
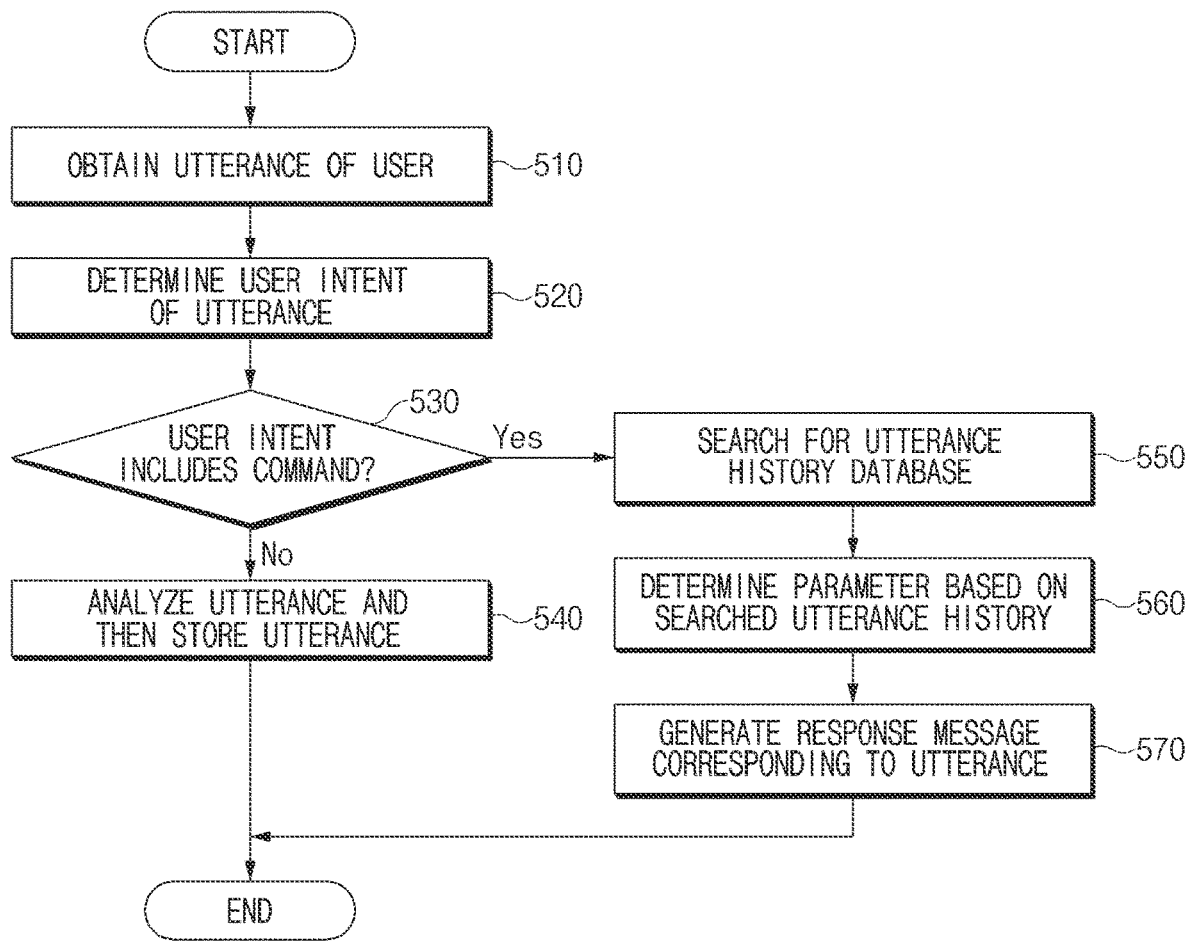
FIG. 5 is a flowchart of operations of an intelligence server that refers to utterance history of another person, according to various embodiments of the disclosure.
Figure 6:
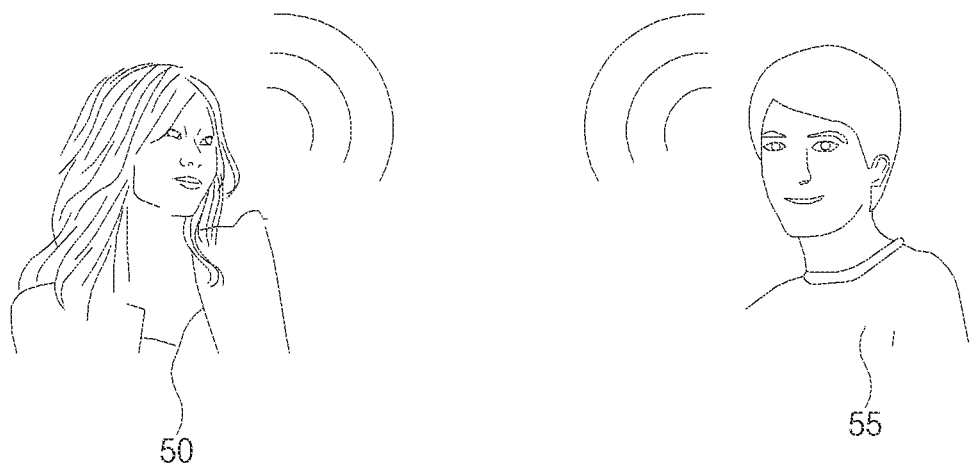
FIG. 6 is an example of a situation of referring to utterance history of another user in an environment for providing a speech recognition service, according to various embodiments.

FIG. 5 is a flowchart of operations of an intelligence server that refers to utterance history of another person, according to various embodiments of the disclosure. FIG. 6 is an example of a situation of referring to utterance history of another user in an environment for providing a speech recognition service, according to various embodiments. FIG. 7 is an example of utterance history data stored in an utterance history database according to various embodiments. FIG. 8 is an example of a response message generated by an intelligence server according to various embodiments. Hereinafter, the operation of the intelligence server that refers to utterance history of another person will be described with reference to FIGS. 5 to 8. For example, operations to be described later may be performed by at least one module 210, 220, 230, 240, 250, or 260 included in the intelligence server 200.

Referring to FIG. 6, the illustrated users 50 and 55 may be referred to as users registered in the speech recognition service. The first user 50 (e.g., it may be assumed that the name of the first user is 'A') may be registered as a user of the first terminal. The second user 55 (e.g., it may be assumed that the name of the second user is 'B') may be registered as a user of the second terminal. The intelligence server 200 may receive utterances A-1, B-1, and B-2.

In operation 510, the intelligence server 200 may obtain a user's utterance from a user terminal (e.g., the user terminal 100). For example, the intelligence server 200 may receive the utterance A-1 from the first terminal of the first user 50. The intelligence server 200 may receive the utterances B-1 and B-2 from the second terminal of the second user 55.

In operation 520, the intelligence server 200 may determine the user's intent from the obtained utterance. For example, when the utterance that means the processing of the voice command includes a pre-specified command (e.g., specific phrases such as 'Hi Bixby'), the intelligence server 200 may determine that the utterance includes a control command. For another example, as described above, the intelligence server 200 may determine the user intent of the utterance, using the NLU module 220 (e.g., the NLU module 220 of FIG. 3).

Referring to FIG. 6, the intelligence server 200 may determine the intent of the first user 50 for the utterance A-1 as a product purchase, and may determine the intent of the second user 55 for the utterance B-2 as a product purchase and control command (e.g., the command to purchase a product for a mart application) for the second terminal. For example, when the determined user's intent is to trigger a specific operation or function of the user terminal or the intelligence server 200, the intelligence server 200 may determine that the first utterance includes a control command.

In operation 540, when the utterance does not include a control command, the intelligence server 200 may analyze the utterance and may store the utterance in the storage 205.

For example, the utterance A-1 and utterance B-1 do not include control commands, and thus the intelligence server 200 may analyze the utterance A-1 and the utterance B-1 and may store the utterance A-1 and the utterance B-1 in the storage 205. Referring to FIG. 7, an example of utterance history data 225 has been illustrated. The utterance history data 225 may be stored in the utterance history database 223 of the intelligence server 200. For example, the utterance A-1 may be stored in the same format as data 1 225-1 of utterance history data 225 or utterance history data 227. For example, the utterance B-1 may be stored in the same format as data 2 225-1 of utterance history data 225.

In an embodiment, the utterance history data 225 may include tag information. The tag information may be referred to as information associated with an utterance. Referring to FIG. 7, tag information may include a speaker, date/time, and a place. For example, referring to data 1 225-1, it may be seen that the utterance A-1 has been uttered at home in the morning by the first user 50 (user A). In an embodiment, the utterance history data 225 may include text data converted from the utterance. For example, the utterance A-1 may be converted to a text, and then the text data of "please buy 2 liters of milk, a tray of 15 eggs, and a watermelon on the way home" may be included in the utterance history data 225.

In another embodiment, the utterance history data 227 may include a user intent (or intention) and at least one parameter that are determined from the utterance. For example, the user intent of the utterance A-1 may be determined as a 'product purchase', and parameters necessary for product purchase may be determined as "2 liters of milk," "a tray of 15 eggs," and "a watermelon." The utterance history data 227 may include the determined user intent and parameter (e.g., item).

In operation 530, when the utterance includes a control command, the intelligence server 200 may determine at least one parameter corresponding to the utterance and may generate a response message. The intelligence server 200 may transmit the generated response message to the user terminal.

In operation 550, the intelligence server 200 may search for the utterance history database 223 to determine utterance history to be referenced when the intelligence server 200 determines the parameter. In operation 560, the intelligence server 200 may determine at least one parameter with reference to the searched utterance history. In operation 570, the intelligence server 200 may generate a response message corresponding to the first utterance based on the determined intent of the user and at least one parameter.

For example, the utterance B-2 may include a control command for the second terminal. The intelligence server 200 may generate a response message that allows the second terminal to perform a product purchase function. For example, the intelligence server 200 may determine at least one parameter necessary to perform a product purchase function. For example, an item to be purchased, and a place to purchase the item may be referred to as parameters necessary to perform the product purchase function.

Referring to FIG. 8, before referring to the utterance A-1 of the first user 50, the 'item' parameter corresponding to the utterance B-2 may not be determined or may be determined as 'what 'A' has asked to buy'. First, the intelligence server 200 may attempt to determine a parameter of the utterance B-2 based on information associated with the second user, which is stored in the utterance history database 223 associated with the second user 55, or is received from the user database (e.g., the user database 145 in FIG. 2) of the second terminal. However, in this case, the 'item' parameter may be obtained from the utterance of the first user different from the second user, and thus it may not be determined by information associated with the second user.

In various embodiments, when the 'item' parameter is determined to be 'what 'A' has asked to buy', it may be referred to as a case where the parameter is determined but the determined parameter itself is ambiguous. For example, the attribute of the parameter of 'item' may be predefined as a specific object (e.g., a common noun or product name). Because the determined parameter does not match the attribute of the parameter, the intelligence server 200 may refer to the utterance history of the first user 50 to obtain data corresponding to the attribute of the parameter. For example, the intelligence server 200 may extract a keyword from the currently-determined parameter. For example, the intelligence server 200 may search for past utterance history of user A (others), using ('AM', 'A', 'what someone has asked to buy') as a keyword.

In an embodiment, the intelligence server 200 may search for utterance history of the first user 50 associated with the utterance B-2 in the utterance history database 223. After the utterance A-1 of the first user 50 is referenced, parameters of 'item' corresponding to the utterance B-1 may be determined as "2 liters of milk," "a tray of 15 eggs," and "a watermelon."

In various embodiments, a plurality of parameters may be required such that a specified function is performed in the user terminal 100 or the intelligence server 200. Referring to FIG. 8, the parameter corresponding to the utterance B-2 of the second user may be referred to as an 'item' and 'place'.

In various embodiments, the intelligence server 200 may determine at least part of the plurality of parameters corresponding to the utterance B-2 of the second user 55 based on the data associated with the second user 55, and then may determine the remaining parameters among the plurality of parameters, which are not determined based on the second database, based on the first utterance.

For example, 'place' among the parameters corresponding to the utterance B-2 may be specified as only data associated with the utterance B-2 of the second user 55 and the second user 55. However, 'item' may be determined by referring to the data associated with the first user 50. The intelligence server 200 may determine 'item' that is not determined based on the data associated with the second user 55, based on data associated with another user different from the second user 55.

Figure 9:
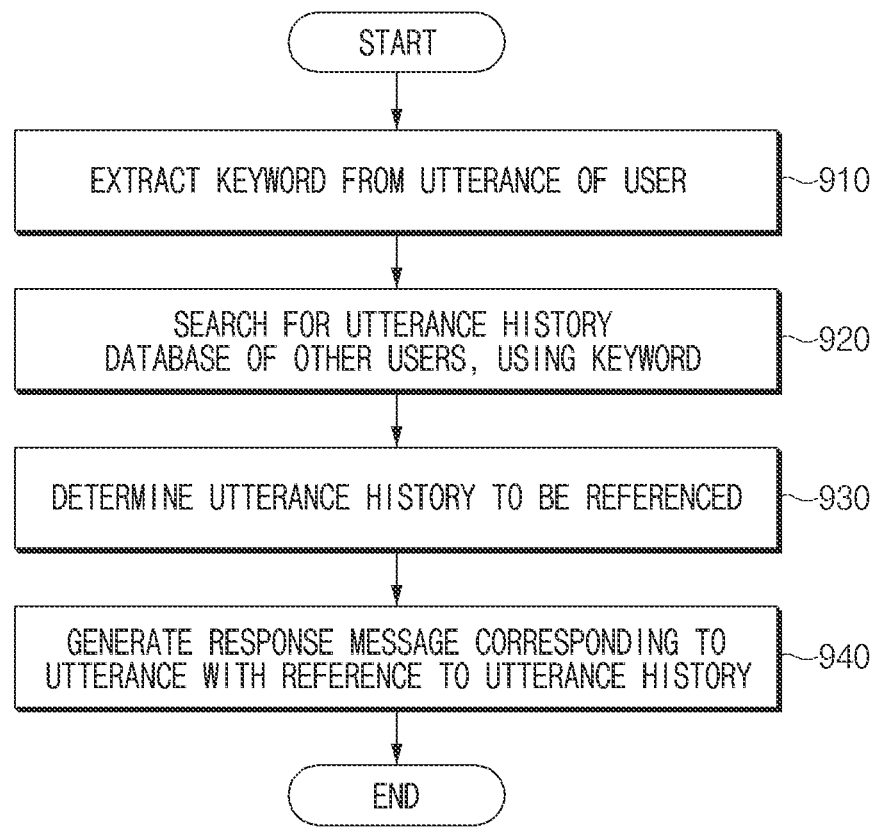
FIG. 9 is a flowchart of an intelligence server's operation of searching for an utterance history database and referring to an utterance history according to an embodiment.
Figure 10:
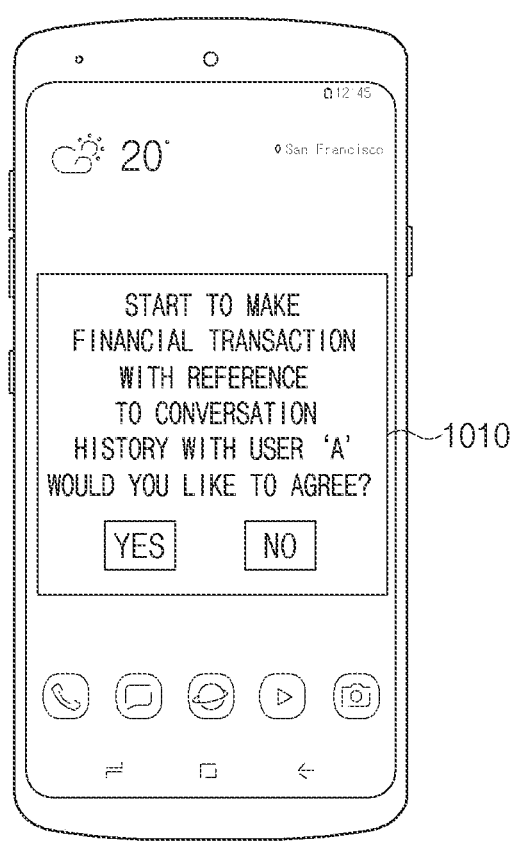
FIG. 10 is an example of an interface displayed on a user terminal, according to an embodiment.

FIG. 9 is a flowchart of an intelligence server's operation of searching for an utterance history database and referring to an utterance history, according to an embodiment of the disclosure. FIG. 10 is an example of an interface displayed on a user terminal, according to an embodiment of the disclosure. For example, operations to be described later with reference to FIGS. 9 and 10 may be performed by at least one module 210, 220, 230, 240, 250, or 260 included in the intelligence server 200. Operation 910 to operation 940 will be described with reference to FIGS. 6 to 8.

In operation 910, the intelligence server 200 may extract at least one keyword from a user's utterance. In an embodiment, for example, the intelligence server 200 may extract time, date, places, user names, operations from the utterance. For example, the intelligence server 200 may extract keywords such as 'AM', 'A', and 'product purchase' from the utterance B-2.

In operation 930, the intelligence server 200 may search for the utterance to be referenced, from the utterance history database 223 using the extracted at least one keyword.

For example, referring to FIG. 7, the intelligence server 200 may search the utterance history data 227 included in the utterance history database 223 using the keyword ('AM', 'A', and 'product purchase').

For example, referring to FIG. 7, the intelligence server 200 may search data 1 225-1 and data 3 225-3 among the utterance history data 225 included in the utterance history database 223 using the keyword ('AM', and 'A'). For example, the intelligence server 200 may perform a detailed search again, using the keyword of 'product purchase' with respect to the data 1 225-1 and the data 3 225-3. The intelligence server 200 may narrow the search range, using some keywords and may perform the detailed search again. The intelligence server 200 may determine that the data 1 225-1 is data to be referenced.

In various embodiments, the intelligence server 200 may select a user corresponding to the extracted keyword. For example, because the keyword extracted from the utterance B-2 includes 'A', the intelligence server 200 may select the first user 50. When the first user 50 is selected, the intelligence server 200 may search a database associated with the first user 50. For example, when the intelligence server 200 has separate databases for respective different users, the search range may be narrowed to a database associated with a specific user.

In operation 940, the intelligence server 200 may generate a response message corresponding to the utterance with reference to the utterance history of the selected user. For example, the intelligence server 200 may generate a response message corresponding to the utterance B-2 of the second user 55, with reference to the utterance history (e.g., the data 1 225-1 and the utterance history data 227 in FIG. 7) corresponding to the utterance A-1 of the first user 50. The intelligence server 200 may transmit the response message to the second terminal of the second user 55.

In various embodiments, the intelligence server 200 may transmit a control signal to the user terminal 100 such that the user terminal 100 displays an interface for requesting a check request for performing a function corresponding to the response message. The control signal may be transmitted together with the response message.

In various embodiments, when the user terminal 100 receives a response message from the intelligence server 200, the user terminal 100 outputs an interface for requesting the user's check request through the display or the microphone to execute the response message that refers to the utterance history of another user associated with the user of the user terminal 100. The user terminal 100 may receive a check input corresponding to the interface through the display or the microphone. The user terminal 100 may perform at least one function corresponding to the response message in response to the received check input.

For example, in the case where the intelligence server 200 refers to data associated with another user registered in the speech recognition service, not the user of the user terminal 100, when the intelligence server 200 generates a response message, the intelligence server 200 or the user terminal 100 may request a check request from the user and/or another user when a function corresponding to the response message is to be performed.

In an embodiment, when performing a functions capable of requiring personal information such as financial transactions and disabling security, the user terminal 100 may output the interface to a display (e.g., the display 120 of FIG. 2) or through a speaker (e.g., the speaker 130 of FIG. 2). Referring to FIG. 10, an example of an interface 1010 requiring the user's check request displayed on the display has been illustrated. The user may select 'YES' in response to the interface. When receiving a check input, the user terminal 100 may perform the function.

In various embodiments, the intelligence server 200 may determine whether to refer to another person's utterance history, with reference to the group database 224. For example, utterance history of another user having a relationship with the user such as a marital relationship or family relationship may be set to refer to the utterance history without the consent of the user or the other user.

Figure 11:
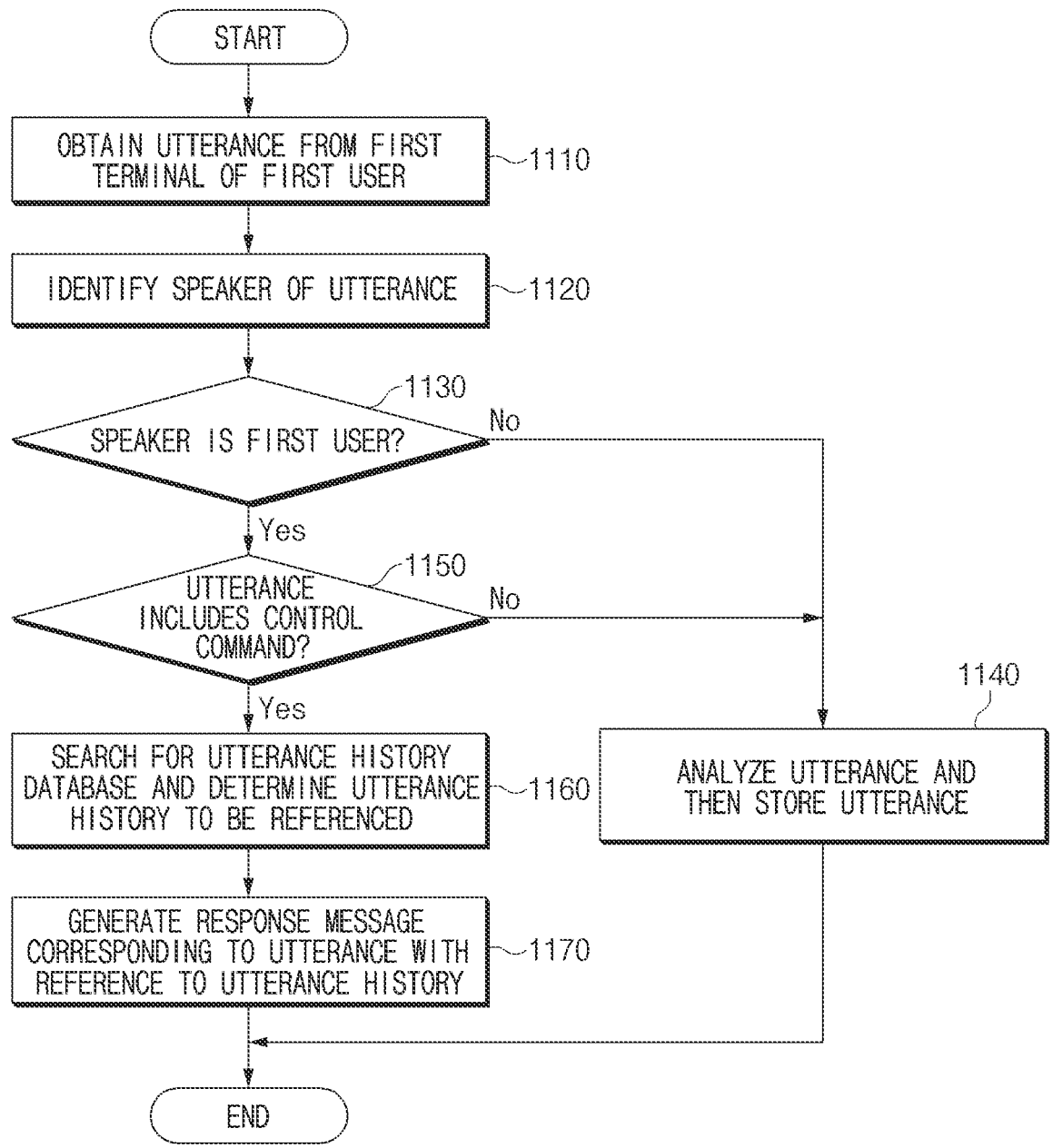
FIG. 11 is a flowchart of operations of an intelligence server that refers to utterance history of another person, according to various embodiments of the disclosure.

FIG. 11 is a flowchart of operations of an intelligence server that refers to utterance history of another person, according to various embodiments of the disclosure. For example, operation 1110 to operation 1170 to be described later may be performed by at least one module 210, 220, 230, 240, 250, or 260 included in the intelligence server 200. Operation 1110 to operation 1170 will be described with reference to FIGS. 6 to 8.

According to various embodiments, the intelligence server 200 may include the pattern database 271 including utterance pattern data for a plurality of users registered in a speech recognition service. For example, the utterance pattern data may include information obtained by analyzing utterance patterns of the plurality of users. The intelligence server 200 (e.g., the speaker recognition module 270 of FIG. 2) may determine a speaker of the utterance received from the user terminal 100, with reference to the pattern database 271.

In operation 1110, the intelligence server 200 may receive an utterance from a terminal (e.g., the user terminal 100) of the first user registered in the speech recognition service through the network interface 201. In operation 1120, the intelligence server 200 (e.g., the speaker recognition module 270 of FIG. 2) may identify the speaker of the received utterance based on the utterance pattern database 271. For example, the intelligence server 200 may compare the received utterance pattern with utterance pattern data stored in the utterance pattern database 271.

In various embodiments, the intelligence server 200 may receive an utterance of an arbitrary speaker from the terminal of the first user. For example, the terminal of the first user may transmit the utterance of another speaker as well as the first user to the intelligence server 200. In operation 1130, the intelligence server 200 may perform different operations depending on whether the determined speaker is the first user.

In operation 1140, when the determined speaker is not the first user, the intelligence server 200 may analyze the utterance and then may store the utterance in the storage 205. For example, the utterance may be stored in the utterance history database 223 of the storage 205 in the form of the utterance history data 225 and 227 described above in FIG. 7. For example, the utterance may be stored in a database associated with the determined speaker. The control command for the first user terminal may be uttered by the first user, and thus the intelligence server 200 may store utterance of a speaker, not the first user, in the utterance history database 223.

When the determined speaker is the first user, in operation 1150, the intelligence server 200 may determine the intent of the first user corresponding to the utterance. When the utterance does not include a control command, in operation 1140, the intelligence server 200 may analyze the utterance and may store the utterance in the storage 205.

When the utterance includes the control command, in operation 1160, the intelligence server 200 may search for the utterance history database 223 and may determine utterance history to be referenced. In operation 1170, the intelligence server 200 may generate a response message corresponding to the utterance with reference to the utterance history. The generated response message may be transmitted to the first terminal.

Figure 12:
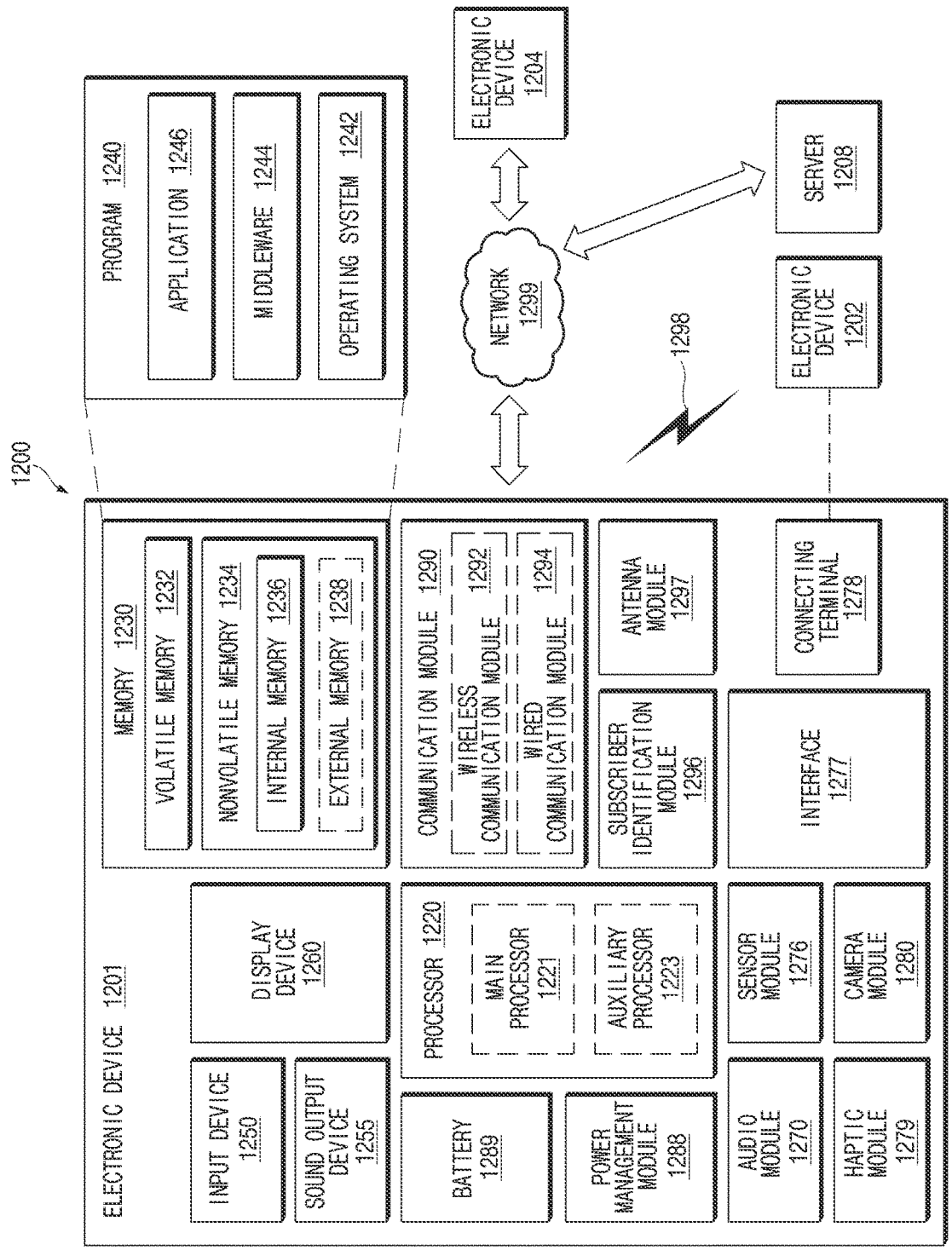
FIG. 12 illustrates an electronic device in a network environment, according to various embodiments.

FIG. 12 illustrates an electronic device 1201 in a network environment 1200, according to various embodiments. An electronic device according to various embodiments of the disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of the disclosure may not be limited to the above-described devices, and may provide functions of a plurality of devices like smartphones which have measurement function of personal biometric information (e.g., heart rate or blood glucose). In the disclosure, the term "user" may refer to a person who uses an electronic device or may refer to a device (e.g., an artificial intelligence electronic device) that uses the electronic device.

Referring to FIG. 12, under the network environment 1200, the electronic device 1201 (e.g., the user terminal 100 of FIG. 2) may communicate with an electronic device 1202 through short-range wireless communication 1298 or may communication with an electronic device 1204 or a server 1208 through a network 1299. According to an embodiment, the electronic device 1201 may communicate with the electronic device 1204 through the server 1208.

According to an embodiment, the electronic device 1201 may include a bus 1210, a processor 1220 (e.g., the processor 150 of FIG. 2), a memory 1230, an input device 1250 (e.g., a microphone or a mouse), a display device 1260, an audio module 1270, a sensor module 1276, an interface 1277, a haptic module 1279, a camera module 1280, a power management module 1288, a battery 1289, a communication module 1290, and a subscriber identification module 1296. According to an embodiment, the electronic device 1201 may not include at least one (e.g., the display device 1260 or the camera module 1280) of the above-described components or may further include other component(s).

The bus 1210 may interconnect the above-described components 1220 to 1290 and may include a circuit for conveying signals (e.g., a control message or data) between the above-described components.

The processor 1220 may include one or more of a central processing unit (CPU), an application processor (AP), a graphic processing unit (GPU), an image signal processor (ISP) of a camera or a communication processor (CP). According to an embodiment, the processor 1220 may be implemented with a system on chip (SoC) or a system in package (SiP). For example, the processor 1220 may drive an operating system (OS) or an application program to control at least one of another component (e.g., hardware or software component) of the electronic device 1201 connected to the processor 1220 and may process and compute various data. The processor 1220 may load a command or data, which is received from at least one of other components (e.g., the communication module 1290), into a volatile memory 1232 to process the command or data and may store the result data into a nonvolatile memory 1234.

The memory 1230 may include, for example, the volatile memory 1232 or the nonvolatile memory 1234. The volatile memory 1232 may include, for example, a random access memory (RAM) (e.g., a dynamic RAM (DRAM), a static RAM (SRAM), or a synchronous DRAM (SDRAM)). The nonvolatile memory 1234 may include, for example, a programmable read-only memory (PROM), a one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 1234 may be configured in the form of an internal memory 1236 or the form of an external memory 1238 which is available through connection only if necessary, according to the connection with the electronic device 1201. The external memory 1238 may further include a flash drive such as compact flash (CF), secure digital (SD), micro secure digital (Micro-SD), mini secure digital (Mini-SD), extreme digital (xD), a multimedia card (MMC), or a memory stick. The external memory 1238 may be operatively or physically connected with the electronic device 1201 in a wired manner (e.g., a cable or a universal serial bus (USB)) or a wireless (e.g., Bluetooth) manner.

For example, the memory 1230 may store, for example, at least one different software component, such as a command or data associated with the program 1240, of the electronic device 1201. The program 1240 may include, for example, a kernel 1241, a library 1243, an application framework 1245 or an application program (interchangeably, "application") 1247.

The input device 1250 may include a microphone, a mouse, or a keyboard. According to an embodiment, the keyboard may include a keyboard physically connected or a virtual keyboard displayed through the display device 1260.

The display device 1260 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1201.

The audio module 1270 may convert, for example, from a sound into an electrical signal or from an electrical signal into the sound. According to an embodiment, the audio module 1270 may acquire sound through the input device 1250 (e.g., a microphone) or may output sound through an output device (not illustrated) (e.g., a speaker or a receiver) included in the electronic device 1201, an external electronic device (e.g., the electronic device 1202 (e.g., a wireless speaker or a wireless headphone)) or an electronic device 1206 (e.g., a wired speaker or a wired headphone) connected with the electronic device 1201

The sensor module 1276 may measure or detect, for example, an internal operating state (e.g., power or temperature) of the electronic device 1201 or an external environment state (e.g., an altitude, a humidity, or brightness) to generate an electrical signal or a data value corresponding to the information of the measured state or the detected state. The sensor module 1276 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 1276 may further include a control circuit for controlling at least one or more sensors included therein. According to an embodiment, the electronic device 1201 may control the sensor module 1276 by using the processor 1220 or a processor (e.g., a sensor hub) separate from the processor 1220. In the case that the separate processor (e.g., a sensor hub) is used, while the processor 1220 is in a sleep state, the separate processor may operate without awakening the processor 1220 to control at least a portion of the operation or the state of the sensor module 1276.

According to an embodiment, the interface 1277 may include a high definition multimedia interface (HDMI), a universal serial bus (USB), an optical interface, a recommended standard 232 (RS-232), a D-subminiature (D-sub), a mobile high-definition link (MHL) interface, an SD card/MMC (multi-media card) interface, or an audio interface. A connecting terminal 1278 may physically connect the electronic device 1201 and the electronic device 1206. According to an embodiment, the connecting terminal 1278 may include, for example, a USB connector, an SD card/MMC connector, or an audio connector (e.g., a headphone connector).

The haptic module 1279 may convert an electrical signal into mechanical stimulation (e.g., vibration or motion) or into electrical stimulation. For example, the haptic module 1279 may apply tactile or kinesthetic stimulation to a user. The haptic module 1279 may include, for example, a motor, a piezoelectric element, or an electric stimulator.

The camera module 1280 may capture, for example, a still image and a moving picture. According to an embodiment, the camera module 1280 may include at least one lens (e.g., a wide-angle lens and a telephoto lens, or a front lens and a rear lens), an image sensor, an image signal processor, or a flash (e.g., a light emitting diode or a xenon lamp).

The power management module 1288, which is to manage the power of the electronic device 1201, may constitute at least a portion of a power management integrated circuit (PMIC).

The battery 1289 may include a primary cell, a secondary cell, or a fuel cell and may be recharged by an external power source to supply power at least one component of the electronic device 1201.

The communication module 1290 may establish a communication channel between the electronic device 1201 and an external device (e.g., the first external electronic device 1202, the second external electronic device 1204, or the server 1208). The communication module 1290 may support wired communication or wireless communication through the established communication channel. According to an embodiment, the communication module 1290 may include a wireless communication module 1292 or a wired communication module 1294. The communication module 1290 may communicate with the external device through a first network 1298 (e.g., a short range communication network such as Bluetooth or infrared data association (IrDA)) or a second network 1299 (e.g., a wireless wide area network such as a cellular network) through a relevant module among the wireless communication module 1292 or the wired communication module 1294.

The wireless communication module 1292 may support, for example, cellular communication, short-range wireless communication, global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The short-range wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 1292 supports cellar communication, the wireless communication module 1292 may, for example, identify or authenticate the electronic device 1201 within a communication network using the subscriber identification module (e.g., a SIM card) 1296. According to an embodiment, the wireless communication module 1292 may include a communication processor (CP) separate from the processor 1220 (e.g., an application processor (AP)). In this case, the communication processor may perform at least a portion of functions associated with at least one of components 1210 to 1296 of the electronic device 1201 in substitute for the processor 1220 when the processor 1220 is in an inactive (sleep) state, and together with the processor 1220 when the processor 1220 is in an active state. According to an embodiment, the wireless communication module 1292 may include a plurality of communication modules, each supporting only a relevant communication scheme among cellular communication, short-range wireless communication, or a GNSS communication.

The wired communication module 1294 may include, for example, a local area network (LAN) service, a power line communication, or a plain old telephone service (POTS).

For example, the first network 1298 may employ, for example, Wi-Fi direct or Bluetooth for transmitting or receiving commands or data through wireless direct connection between the electronic device 1201 and the first external electronic device 1202. The second network 1299 may include a telecommunication network (e.g., a computer network such as a LAN or a WAN, the Internet or a telephone network) for transmitting or receiving commands or data between the electronic device 1201 and the second electronic device 1204.

According to various embodiments, the commands or the data may be transmitted or received between the electronic device 1201 and the second external electronic device 1204 through the server 1208 connected with the second network 1299. Each of the first and second external electronic devices 1202 and 1204 may be a device of which the type is different from or the same as that of the electronic device 1201. According to various embodiments, all or a part of operations that the electronic device 1201 will perform may be executed by another or a plurality of electronic devices (e.g., the electronic devices 1202 and 1204 or the server 1208). According to an embodiment, in the case that the electronic device 1201 executes any function or service automatically or in response to a request, the electronic device 1201 may not perform the function or the service internally, but may alternatively or additionally transmit requests for at least a part of a function associated with the electronic device 1201 to any other device (e.g., the electronic device 1202 or 1204 or the server 1208). The other electronic device (e.g., the electronic device 1202 or 1204 or the server 1208) may execute the requested function or additional function and may transmit the execution result to the electronic device 1201. The electronic device 1201 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B," "at least one of A and/or B," "A, B, or C," or "at least one of A, B, and/or C," and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for," "having the capacity to," "changed to," "made to," "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 1030).

The term "module" used herein may include a unit, which is implemented with hardware, software, or firmware, and may be interchangeably used with the terms "logic," "logical block," "part," "circuit," or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 1230) in the form of a program module. The instruction, when executed by a processor (e.g., the processor 1220), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

What is claimed is:

1. An electronic device comprising:
   a microphone;
   a communication circuitry;
   a memory storing utterance pattern information of a first user registered in the electronic device and instructions; and
   a processor connected to the microphone, the communication circuitry, and the memory,
   wherein the instructions, when executed by the processor, cause the electronic device to:
      obtain an utterance through the microphone,
      determine whether the utterance is uttered by the first user based on the utterance pattern information,
      based on being determined the utterance is uttered by the first user, transmit the utterance to an external server through the communication circuitry,
      receive a response message corresponding to the utterance from the external server through the communication circuitry, and
      execute at least one function corresponding to the response message, and
   wherein the response message is generated with reference to utterance history of a second user different from the first user.

2. The electronic device of claim 1, further comprising:
   a display,
   wherein the instructions, when executed by the processor, cause the electronic device to:
      output an interface for requesting the first user to check whether to execute the at least one function with reference to the utterance history of the second user through the display,
      receive a check input for the interface through the display or the microphone, and
      execute the at least one function in response to the check input.

3. The electronic device of claim 1, wherein the electronic device of the first user and an electronic device of the second user are registered in a speech recognition service provided by the external server.

4. The electronic device of claim 1, further comprising:
a display,
wherein the instructions, when executed by the processor, cause the electronic device to:
- identify whether the at least one function includes a function requiring personal information, and
- based on being identified that the at least one function includes the function requiring personal information, output an interface for requesting the first user to check whether to execute the function requiring personal information with reference to the utterance history of the second user through the display, and wherein the function requiring personal information includes a function related to financial transactions or a function related to disabling security.

5. The electronic device of claim 2,
wherein the instructions, when executed by the processor, cause the electronic device to:
- identify whether the second user has a relationship with the first user, and
- based on being identified that the second user has a relationship with the first user, execute the at least one function without checking of the first user through the interface, and wherein the relationship includes a marital relationship or a family relationship.

6. The electronic device of claim 5,
wherein the relationship is identified based on data associated with social activities between the first user and different users, and
wherein the data includes a call log of the electronic device.

7. A method performed by an electronic device, the method comprising:
- obtaining an utterance through a microphone;
- determining whether the utterance is uttered by a first user registered in the electronic device based on utterance pattern information stored in the electronic device;
- based on being determined the utterance is uttered by the first user, transmitting the utterance to an external server through a communication circuitry;
- receiving a response message corresponding to the utterance from the external server through the communication circuitry; and
- executing at least one function corresponding to the response message, wherein the response message is generated with reference to utterance history of a second user different from the first user.

8. The method of claim 7, further comprising:
- outputting an interface for requesting the first user to check whether to execute the at least one function with reference to the utterance history of the second user through a display;
- receiving a check input for the interface through the display or the microphone; and
- executing the at least one function in response to the check input.

9. The method of claim 7, wherein the electronic device of the first user and an electronic device of the second user are registered in a speech recognition service provided by the external server.

10. The method of claim 7, further comprising:
- identifying whether the at least one function includes a function requiring personal information; and
- based on being identified that the at least one function includes the function requiring personal information, outputting an interface for requesting the first user to check whether to execute the function requiring personal information with reference to the utterance history of the second user through a display, wherein the function requiring personal information includes a function related to financial transactions or a function related to disabling security.

11. The method of claim 8, further comprising:
- identifying whether the second user has a relationship with the first user; and
- based on being identified that the second user has a relationship with the first user, executing the at least one function without checking of the first user through the interface, wherein the relationship includes a marital relationship or a family relationship.

12. The method of claim 11,
wherein the relationship is identified based on data associated with social activities between the first user and different users, and
wherein the data includes a call log of the electronic device.

* * * * *